Oct. 8, 1957  J. H. ROGERS  2,808,923
ADJUSTABLE COUNTERBALANCED EXTENSIBLE CONVEYOR
Filed May 23, 1955  3 Sheets-Sheet 1
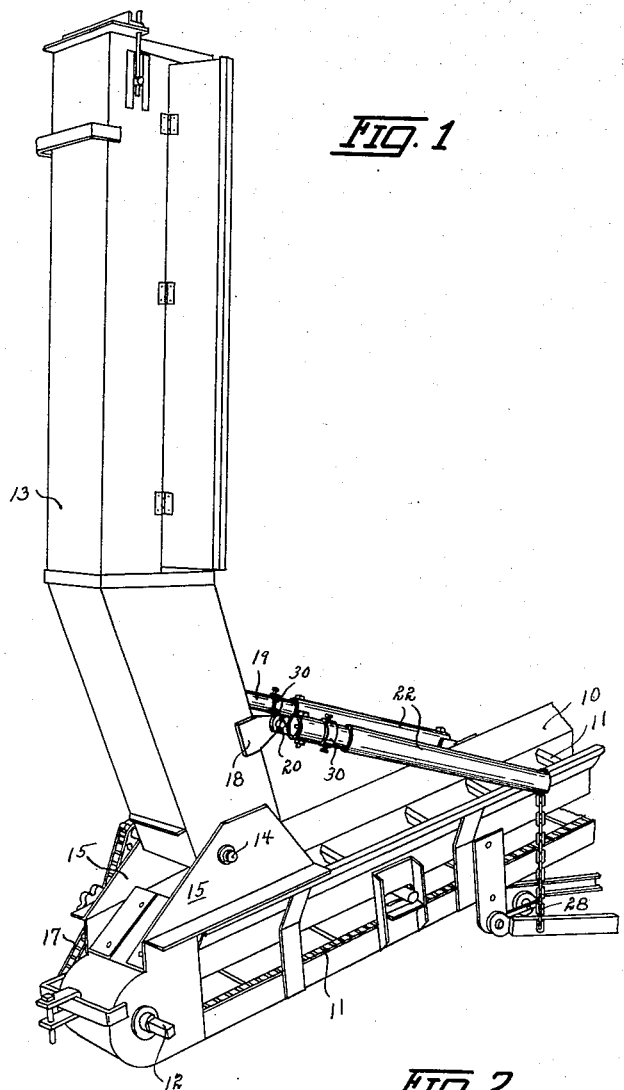
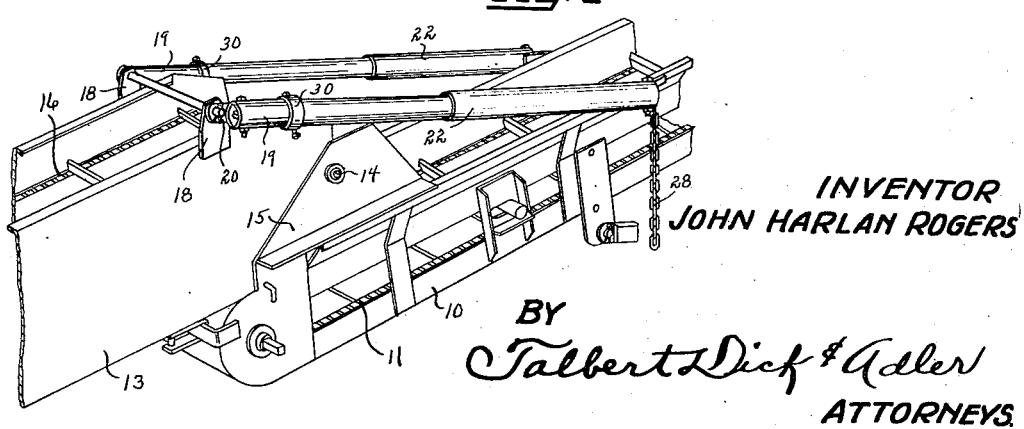
INVENTOR
JOHN HARLAN ROGERS
BY
Talbert Dick & Adler
ATTORNEYS.

Oct. 8, 1957 J. H. ROGERS 2,808,923
ADJUSTABLE COUNTERBALANCED EXTENSIBLE CONVEYOR
Filed May 23, 1955 3 Sheets-Sheet 2
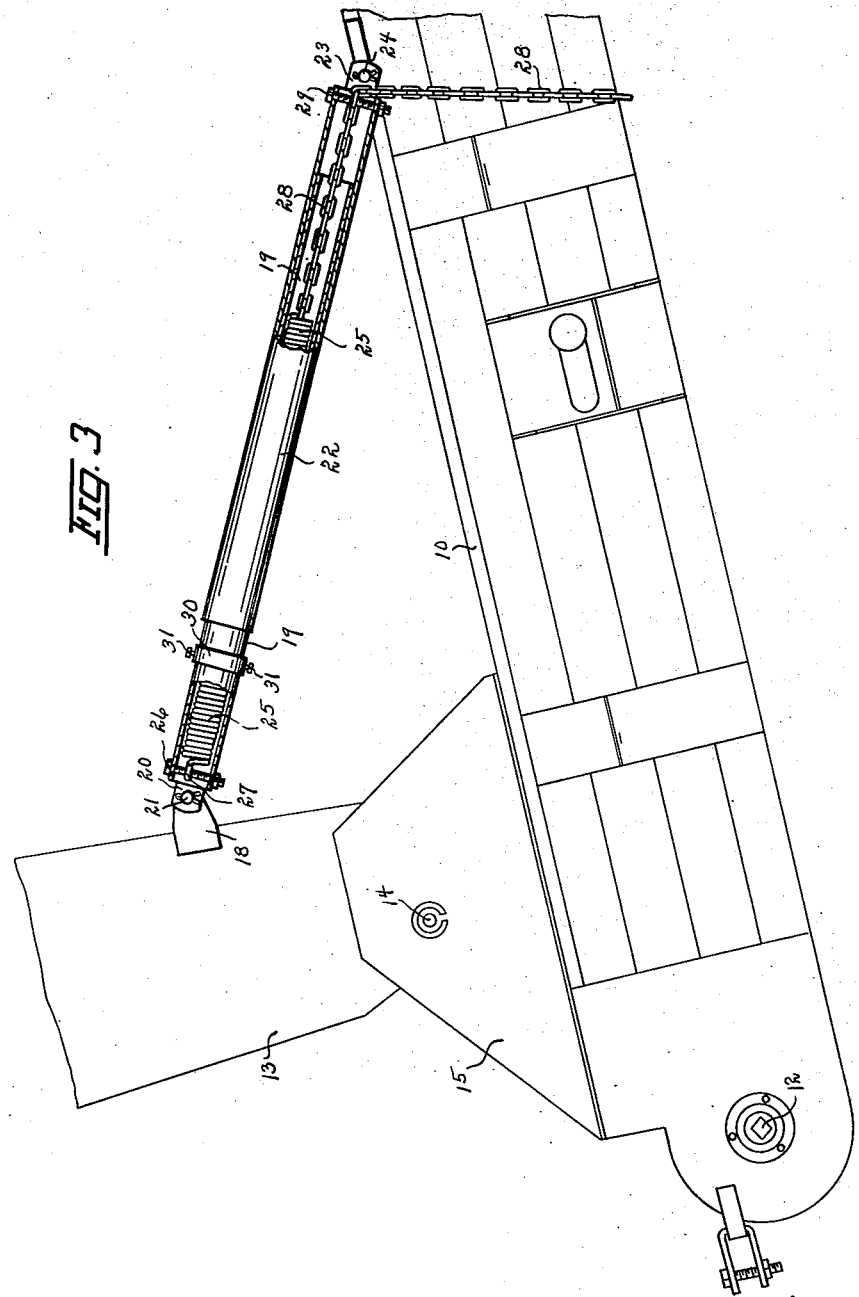
INVENTOR.
JOHN HARLAN ROGERS
BY
*Talbert Dick & Adler*
ATTORNEYS.

Oct. 8, 1957 J. H. ROGERS 2,808,923
ADJUSTABLE COUNTERBALANCED EXTENSIBLE CONVEYOR
Filed May 23, 1955 3 Sheets-Sheet 3
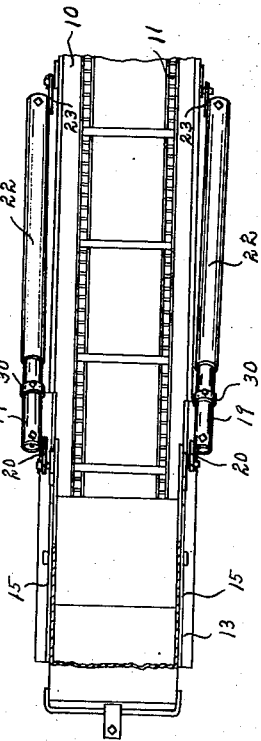
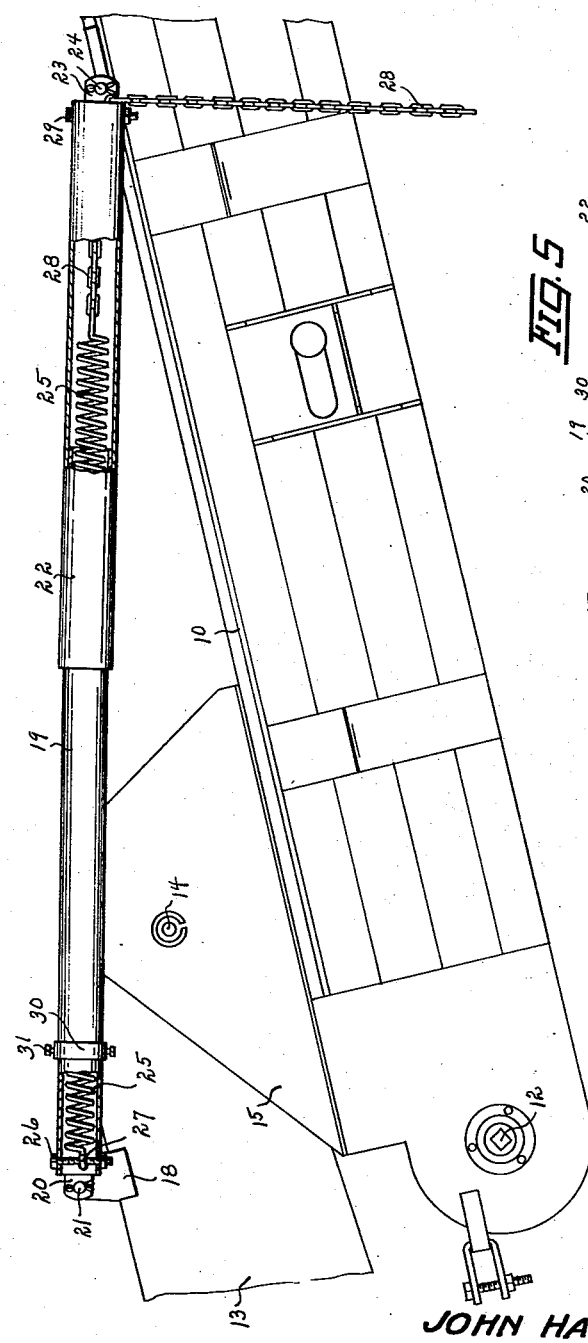
INVENTOR.
JOHN HARLAN ROGERS
BY
*Talbert Dick & Adler*
ATTORNEYS.

United States Patent Office 2,808,923
Patented Oct. 8, 1957

2,808,923

ADJUSTABLE COUNTERBALANCED EXTENSIBLE CONVEYOR

John Harlan Rogers, Fort Dodge, Iowa

Application May 23, 1955, Serial No. 510,447

7 Claims. (Cl. 198—98)

This invention relates to conveyors for elevating or lowering bulk and/or packaged materials and more particularly to elongated conveyors that have a hinged extension.

Such elongated conveyors are now in universal usage. In general they are of trough construction with an endless chain carrier. Inasmuch as they are frequently moved from one location to another; some are in two parts, i. e., the rear lower section is hinged to the other section; and during transit, or storage this rear section is swung upwardly to conserve length and space. However, it is most difficult to either raise or lower this hinged section. Furthermore chains, ropes, or like, must be used to tie and hold the hinged section in such inoperative upright position.

Therefore, one of the principal objects of my invention is to provide a means for facilitating the raising and lowering of the hinged section of a conveyor.

A further object of this invention is to provide an extendible elongated conveyor that will maintain the hinged section in a near vertical condition when it is placed in an upright inoperative condition.

A still further object of my invention is to provide a sectional inclined conveyor or elevator that has the weight of its movable section or unit counterbalanced.

A still further object of my invention is to provide an adjustable spring tension brace means for hinge sectioned conveyors that may be easily and quickly installed on a conveyor.

Still further objects of this invention are to provide a counterbalanced section conveyor that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my invention with the rear hinged section being held in an inoperative elevated condition, Fig. 2 is a perspective view of the device showing the two sections of the conveyor extended for operation, Fig. 3 is an enlarged side view of my counterbalancing means with sections cut away to more fully illustrate its construction, Fig. 4 is an enlarged side view of my invention with sections cut away to show the position of the various elements when the hinged unit of the conveyor is horizontally extended, and Fig. 5 is a top plan view of the invention.

In the drawings I have used the numeral 10 to designate the front trough frame unit of an ordinary conveyor. Normally this section will extend forwardly and upwardly to the point of deposit of the matter being mechanically elevated. Such conveyors have the usual endless chain conveying assembly 11, rotated by a shaft 12 which is adapted to be connected to a prime mover (not shown). Pivoted to the rear top of the unit 10, is the rear trough conveyor section 13 as shown in Figs. 1 and 2. This hinge structure may be the unit's chain conveyor shaft 14 extending through rigid flanges 15 on the upper rear end of the unit 10. The rear chain shaft of the unit 10 and the forward chain shaft 14 of the unit 13 are operatively connected together by a sprocket gear and chain assembly 17. The numeral 16 designates the chain conveyor of the unit 13. When the rear section 13 is in effective lowered condition it will extend substantially horizontal and it usually is into this rear unit section that the material to be elevated is placed. It is to such a conveyor that I install my invention and which I will now describe in detail.

On each forward top side of the unit I have secured an ear 18. I employ two duplicate assemblies, and inasmuch as both are identical, I will describe one complete unit, it being understood that the common elements of both have common designating numerals and that the function and operation are identical. The numeral 19 designates a tube cylinder having a lug 20 fixed to its rear side end. The numeral 21 designates a pin extending through the ear 18 and the lug 20, thus hingedly securing the rear end of the tube cylinder 19 to the unit 13. The numeral 22 designates a second tube cylinder telescoping on the tube cylinder 19 as shown in Fig. 4. The numeral 23 designates a lug fixed on the forward end side of the tube cylinder 22. Numeral 24 designates a pin fixed to the side of the conveyor unit 10 and which extends through the lug 23, thus hingedly securing the forward end of the cylinder 22 to the unit 10. Obviously when the unit 13 is lowered or raised relative to the unit 10, the members 19 and 22 will telescope inwardly and outwardly. The numeral 25 designates an elongated coil spring extending inside the units 19 and 22. A bolt 26 detachably extends through the rear end portion of the tube cylinder 19, and an eye 27 on the rear end of the coil spring 25. The numeral 28 designates a link chain having its rear end secured to the forward end of the spring 25, its length extending the rest of the way through the cylinder 22, and then loosely downwardly therefrom as shown in Fig. 3. The numeral 29 designates a bolt detachably extending through the forward end portion of the cylinder 22 and selectively through one of the links of the chain 28. The numeral 30 designates a ring slidably embracing the tube cylinder 19. Threaded cap screws 31 extend through this ring collar for rigidly holding the collar in any selected position of its sliding movement.

The practical operation of my device is as follows: Assuming that the unit 13 is in elevated position, as shown in Fig. 1, the bolt or pin 29 is removed and the chain pulled to the desired tautness from the end of the cylinder 22, then the bolt or pin 29 replaced to extend through one of the links of the chain adjacent thereto, as shown in Fig. 3. By virtue of the coil spring, the two telescoping tubes 19 and 22 will be yieldingly held in contracted telescoping positions. As shown in the drawings, I use two of my units but regardless of whether one unit is used or two units, my invention serves as an efficient brace for holding the unit 13 in an upright position. However, this brace will be a yieldable one subject to certain limitations. One such limitation to the forward swinging movement of the unit 13 is the collar 30. Obviously, with this collar 30 in place, it will limit the contraction of one tube element 19 into the other tube element 22. As before noted, this limitation is adjustable by selecting the position of the collar ring on the tube 19. A limit to the expanding of the telescoped members is controlled by the spring and chain. My units also act as a counterbalance to the weight of the conveyor unit 13. As before seen, the effectiveness and degree of this counterbalancing will depend upon the selected link of the chain through which the bolt 29 is inserted. While my brace units will normally hold the conveyor portion 13 in elevated position it is possible, provided the springs are not under too much tension, to lower the unit 13 to a horizontal position without the removal of the bolts 29. Once the member 13 is in a near horizontal position my brace units will be at a less angle thereto and not of sufficient strength to return the unit 13 to a vertical position. However, the usual procedure, before lowering the unit 13, would be to remove the bolts 29 and at least extend them through links of the chain closer to the forward ends of the chains. Once this is done, the function of my brace units will be to at least partially counterbalance the weight of the unit 13 and the same may be easily manually moved to a lowered horizontal position without great effort and without danger of dropping and damaging the unit 13 during the lowering process.

From the foregoing it will be seen that my brace units are adjustable as to yielding strength merely by the selection of the chain links through which the bolts 29 are passed.

Some changes may be made in the construction and arrangement of my adjustable counterbalanced extensible conveyor without departing from the real spirit and purpose of my invention, and it is my intention to cover by my claims, any modified forms of structure or use of mechanical equivalents which may be reasonably included within their scope.

I claim:

1. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, a link chain connected to the other end of said spring and having its length exiting from said second tubular member, and a member extending through said second tubular member and selectively through the links of said chain.

2. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, a link chain connected to the other end of said spring and having its length exiting from said second tubular member, and a means for selectively securing various points in the length of said chain to said second tubular member.

3. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, a link chain connected to the other end of said spring and having its length exiting from said second tubular member, a member extending through said second tubular member and selectively through the links of said chain, and a means for limiting the contracting telescoping action of said two tubular members.

4. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, a link chain connected to the other end of said spring and having its length exiting from said second tubular member, a member extending through said second tubular member and selectively through the links of said chain, and an adjustable means for limiting the contracting telescoping action of said two tubular members.

5. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, an elongated flexible member secured to the other end of said spring and exiting from said second tubular member, and a means for securing said elongated member to said second tubular member.

6. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, a link chain connected to the other end of said spring and having its length exiting from said second tubular member, a means for selectively securing various points in the length of said chain to said second tubular member, and an adjustable means for limiting the contracting telescoping action of said two tubular members.

7. A yieldable adjustable brace means for use in combination with a conveyor having a first section and a second section hinged to the first section; said brace means comprising, a first tubular member adapted to be secured to said second section, a second tubular member telescoping with said first tubular member and adapted to be secured to said first section, a coil spring resting in at least one of said tubular members and having one end secured to said first tubular member, an elongated member secured to the other end of said spring and exiting from said second tubular member, a means for securing said elongated member to said second tubular member, and an adjustable means for limiting the contracting telescoping action of said two tubular members.

References Cited in the file of this patent

UNITED STATES PATENTS

| Number | Name | Date |
|---|---|---|
| 1,131,937 | Lockett | Mar. 16, 1915 |
| 1,189,963 | Jones | July 4, 1916 |
| 2,129,338 | Timmons | Sept. 6, 1938 |
| 2,231,680 | Pfauser | Feb. 11, 1941 |
| 2,577,328 | Hyman | Dec. 4, 1951 |